United States Patent Office 3,113,930
Patented Dec. 10, 1963

3,113,930
AQUEOUS EMULSIONS HAVING ANTI-FOAM PROPERTIES AND PROCESS FOR PREPARING SAME
Pierre Jean Chevalier, Lyon, France, assignor to Societe des Usines Chimiques Rhone-Poulenc, Paris, France, a French body corporate
No Drawing. Filed Apr. 1, 1960, Ser. No. 19,191
Claims priority, application France July 23, 1959
5 Claims. (Cl. 252—358)

The present invention relates to the preparation of aqueous emulsions containing liquid organopolysiloxanes, finely divided silica and one or more emulsifying agents.

Many products based on organosilicic compounds have already been proposed for combatting the formation of foam in many different kinds of media: for example in food industries (concentration of sugar, conditioning of fruit juices, aerated beverages and fermentation media), in the manufacture of paper pulp and varnishes, in the condensation of synthetic resins, and in the distillation of various organic liquids in the laboratory.

Generally speaking, the compositions which have proved most active are thick liquids or pastes obtained by adding finely divided loading agents such as silica to silicone oils, the viscosity of which may vary within wide limits, for example from 20 to 100,000 centistokes at room temperature. The products obtained may be used as such, after dilution in organic solvents, or in aqueous emulsions.

For the majority of applications in aqueous media, it is preferred to use emulsions because they combine many advantages. Thus, they permit good dispersion of the antifoam agent in the medium to be freed from foam, they are non-toxic, and they do not give rise to the danger of ignition which results from the use of inflammable solvents.

Unforturnately, it has been found that, while aqueous emulsions of anti-foam agents based on organopolysiloxanes and silica generally give good results in neutral or acid media, this is not the case with alkaline liquids in which the anti-foam agent loses its activity rather rapidly.

In addition, the majority of aqueous emulsions are not always sufficiently stable during storage and it is frequently found, some days after their preparation, that they have separated into two or more layers.

It is obviously desirable to improve the properties of aqueous emulsions of organopolysiloxanes in such a manner as to render them of more general utility.

According to the present invention there is provided a process for the preparation of aqueous organopolysiloxane emulsions which comprises treating finely divided silica with a liquid methylpolysiloxane, grinding the treated silica thus obtained with an organopolysiloxane oil having a ratio of hydrocarbon radicals to silicon atoms between 1.9:1 and 2.1:1 and a viscosity between 10 and 10,000 centistokes at 25° C., and heating the mixture of said treated silica and said oil to 100° to 250° C., and thereafter emulsifying the product obtained in an aqueous medium. The resulting emulsions possess improved activity in alkaline media and improved stability.

The organopolysiloxane oils suitable for the preparation of the emulsions preferably have a viscosity from 100 to 1000 centistokes at room temperature. Methods for preparing these compounds, whose structure may be either linear or cyclic, are well known. The silicas which can be employed are finely divided products, the particles of which have a mean diameter less than 1000 millimicrons, and preferably less than 50 millimicrons, and the surface area of which is it least 50 m.²/g. They are obtained either by precipitation or by combustion of various silicic compounds. Commercial products such as HiSil X 303, Aerosil and Santocel CS are very suitable.

The treatment of these loading agents with organopolysiloxanes has already been described in various publications and consists in bringing the two products into contact at ambient temperature or at elevated temperature and then eliminating, for example by distillation, the excess of siloxane employed.

The duration of the heating of the treated loading agents with the organopolysiloxane oil depends upon the temperature, the nature of the loading agent and the dimensions of its particles. In practice, it has been found that, in order to ensure complete and rapid dispersion of the loading agent in the oil, it is preferable to operate by heating for some hours in the neighbourhood of 150° to 250° C.

The masesses obtained by heating the organopolysiloxane oil and the treated loading agent are generally more or less thick liquids.

The emulsification of these products presents no particular difficulty and is conveniently carried out in a colloid mill with the aid of emulsifying agents, such as esters of fatty acids and of polyalcohols. Commercial products such as Myrj 52 S, Span 65 and Emulfor A give good results.

The anti-foam power of the emulsions of the invention has been measured by bubbling a current of air through an aqueous solution containing a foaming agent and a small quantity of anti-foam agent diluted with water (of the order of one part per thousand to one part per million). The bubbling of the air through liquid in a graduated test tube produces foam, the height of which increases in proportion as the activity of the agent decreases. The time taken by the foam to overflow the test tube is a measure of the activity of the product. In practice, the aqueous alkaline solution used is conveniently obtained by adding 1.5 g. of oleic acid to 15 g. of sodium hydroxide, the volume being made up to 1000 cc. with water.

In addition to the persistence of the anti-foam effect in alkaline media, the time taken for the emulsion to separate into two or more layers is also measured. If this time is greater than 72 hours, the stability of the emulsion is considered satisfactory.

The emulsions prepared in accordance with the process of the invention are suitable for preventing the formation, or stopping the development, of foam in the most varied media, such as fermentation liquors, concentrated sugar juices, and liquids being distilled. However, their use is particularly advantageous with alkaline liquids, such as detergent solutions employed in, for example, washing machines and bottle washing.

The following examples, in which the parts are to be understood to be by weight, will serve to illustrate the invention:

*Example I*

Into a ball mill are introduced 950 parts of a dimethylpolysiloxane oil having a viscosity of 100 centistokes at 25° C., and 50 parts of silica which has been treated with octamethylcyclotetrasiloxane. The silica used is "Aerosil" brand which has a mean particle diameter of 15 millimicrons and is produced by combustion. The mixture is agitated for 6 hours and then allowed to stand for several hours, when the mill is emptied and the product is heated at 200° C. for 16 hours under a current of nitrogen in an apparatus provided with an agitator and then allowed to cool.

The product obtained is emulsified in the following way. Into an agitated apparatus, containing 40 parts of water at 60° C., are placed 13 parts of Myrj 52 S and 18 parts of Span 65 (both made by the Atlas Powder Co.), the temperature being maintained at 60° C. 66 parts of the polysiloxane silica product are then added, followed by 83 parts of water over a period of half an hour. Agitation is continued for half an hour, with the temperature still at 60° C. The product is allowed to cool at ambient temperature.

The emulsion obtained is thereafter ground in a colloid mill to give a homogeneous milky liquid which exhibits no separation after standing for 72 hours.

2 parts of the emulsion obtained are diluted with 98 parts of water, which gives an emulsion containing 0.6% of anti-foam agent. This dilution is used to determine the duration of the activity of the anti-foam agent in alkaline media. For this purpose, 0.1 part is added to 50 parts of the sodium oleate solution previously described.

The following table gives the results obtained with Aerosil untreated and treated with octamethylcyclotetrasiloxane, as also with heated and unheated mixtures of Aerosil and dimethylsiloxane oil.

| Test | Silica employed | Heating at 200° C. of the mixture of silica and siloxane oil | Duration of the anti-foam activity in alkaline medium | Condition of the emulsion after standing for 72 hours |
|---|---|---|---|---|
| 1 | Untreated Aerosil | Unheated | 40–45 seconds | Separates. |
| 2 | do | Heated | 9–10 minutes | Do. |
| 3 | Treated Aerosil | Unheated | 4–6 minutes | Homogeneous. |
| 3 | do | Heated | 20–25 minutes | Do. |

It is found that only the emulsion of Test No. 4, which corresponds to the use of a loading agent pre-treated with octamethylcyclotetrasiloxane and heated with dimethylpolysiloxane oil, gives both a satisfactory duration of activity in alkaline medium and has good stability.

*Example II*

An aqueous anti-foam emulsion is prepared by a process similar to that described in Example I, the Aerosil silica being replaced by the precipitated silica Santocel CS.

200 parts of this silica are heated in a closed vessel for 2½ hours at 350° C. with 20 parts of tetradecamethylhexasiloxane.

The product is allowed to cool and 25 parts of the powder obtained are extracted and ground in the cold for 6 hours with 475 parts of dimethylsiloxane oil having a viscosity of 100 centistokes at 25° C. The product obtained is thereafter heated for 16 hours at 200° C. under a current of nitrogen in an apparatus provided with an agitator.

A pasty liquid is obtained, which is emulsified in water by the method described in Example I. The emulsion obtained is thereafter diluted to 0.6% of anti-foam agent in order to determine the duration of the anti-foam activity in alkaline media under the same conditions as in Example I. The duration of this activity is 19–20 minutes.

By way of comparison, of the Santocel CS is not pre-treated with polysiloxane, or if the loading agent pre-treated with siloxane oil is not heated, the duration of the activity is less than 7 minutes.

I claim:

1. Process for the preparation of stable aqueous dimethylpolysiloxane emulsions giving a persistent anti-foam effect in alkaline media, comprising heating at a temperature of about 350° C. finely divided silica with a liquid methylpolysiloxane containing 2 to 6 silicon atoms in the molecule, grinding the treated silica with a dimethylpolysiloxane oil having a viscosity between 10 and 10,000 centistokes at 25° C. in the proportion of about 50 parts of silica to 950 parts of polysiloxane oil, heating the mixture to between 150° and 250° C., and emulsifying the product in water with the aid of an emulsifying agent selected from the group consisting of fatty acid esters of polyalcohols.

2. Process according to claim 1, wherein the emulsifying agent is a mixture of polyoxyethylene stearate and sorbitan tristearate.

3. Process for the preparation of stable aqueous dimethylpolysiloxane emulsions giving a persistent anti-foam effect in alkaline media, comprising heating at a temperature of about 350° C. for a period of about 2½ hours finely divided silica with a liquid methylpolysiloxane containing 2 to 6 silicon atoms in the molecule, grinding the treated silica with a dimethylpolysiloxane oil having a viscosity between 100 and 1,000 centistokes at 25° C. in the proportion of about 50 parts of silica to 950 parts of polysiloxane oil, heating the mixture to between 150° and 250° C. for several hours, and emulsifying the product in water with the aid of an emulsifying agent which is a mixture of polyoxyethylene stearate and sorbitan tristearate.

4. An anti-foaming composition stable to storage and giving a persistent anti-foam effect in alkaline media, consisting of an aqueous dimethylpolysiloxane emulsion prepared by grinding a finely divided silica, previously heated at a temperature of about 350° C. for a period of 2½ hours, with a liquid methylpolysiloxane containing 2 to 6 silicon atoms in the molecule, with a dimethylpolysiloxane oil having a viscosity between 10 and 10,000 centistokes at 25° C. in the proportion of about 50 parts of treated silica to 950 parts of polysiloxane oil, heating to 150° to 250° C. for several hours, and emulsifying the product in water using an emulsifying agent selected from the group consisting of fatty acid esters of polyalcohols.

5. A composition as claimed in claim 4, wherein the emulsifying agent is a mixture of polyoxyethylene stearate and sorbitan tristearate.

References Cited in the file of this patent
UNITED STATES PATENTS

| 2,632,736 | Currie | Mar. 24, 1953 |
| 2,829,112 | Solomon | Apr. 1, 1958 |